Oct. 27, 1964     W. L. EFFINGER, JR., ETAL     3,153,877
SOARING AND GLIDING AIRCRAFT
Filed Nov. 14, 1962     3 Sheets-Sheet 1
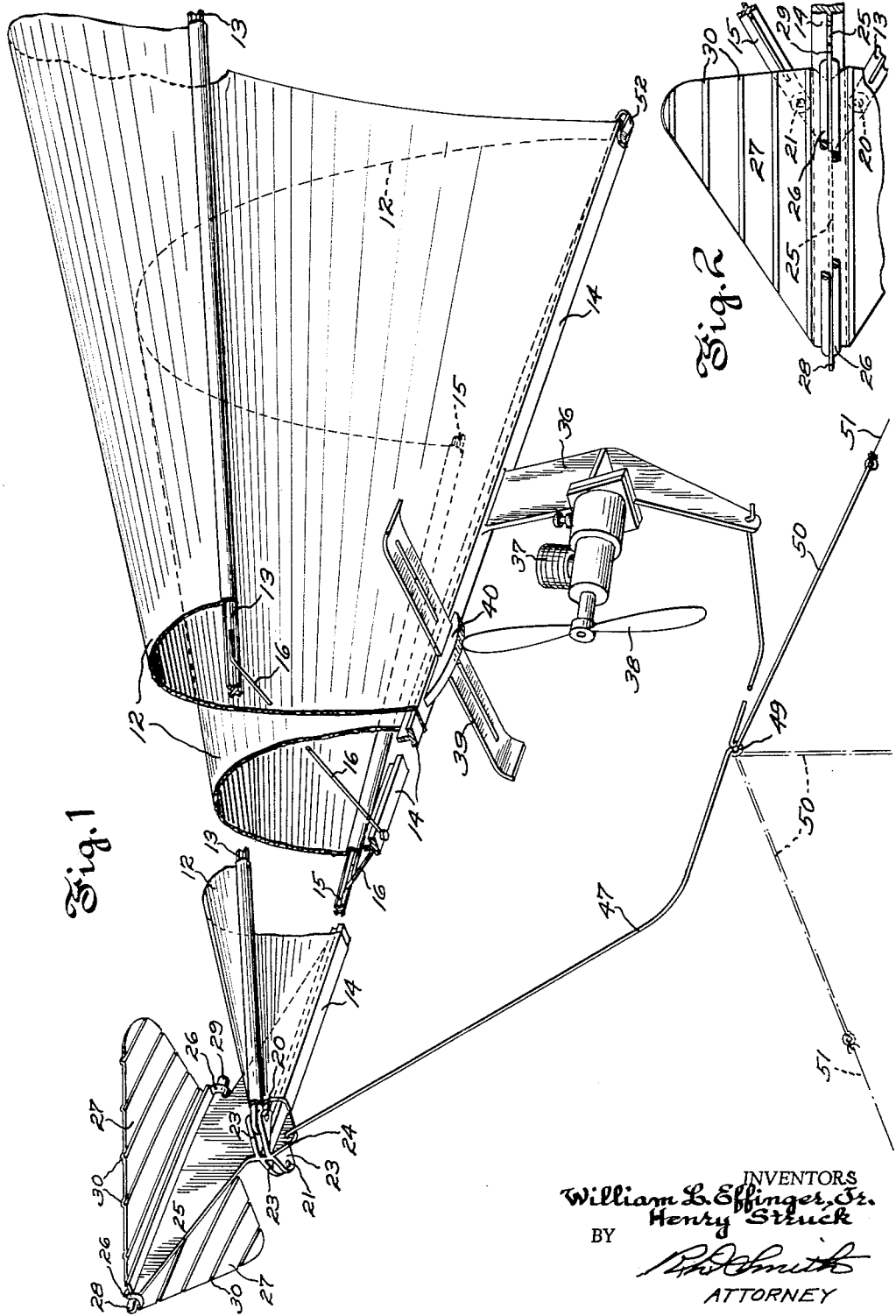
INVENTORS
William L. Effinger, Jr.
Henry Struck
BY
Phil Smith
ATTORNEY

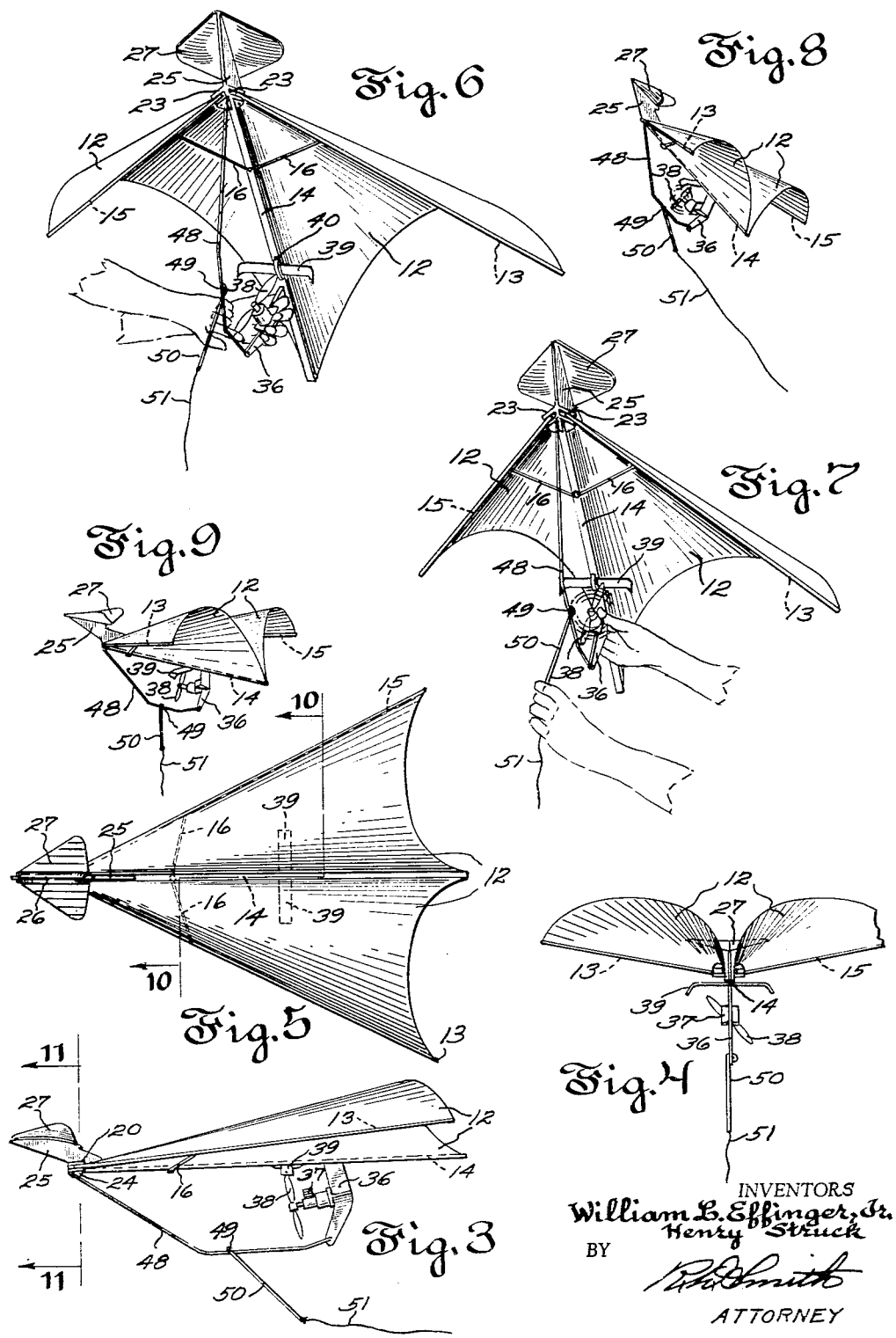

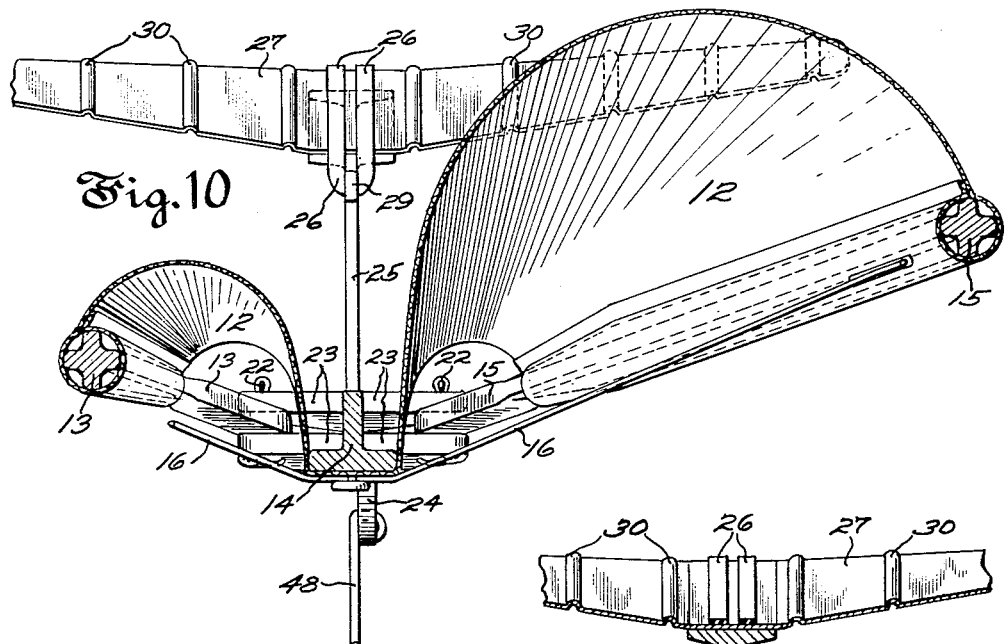
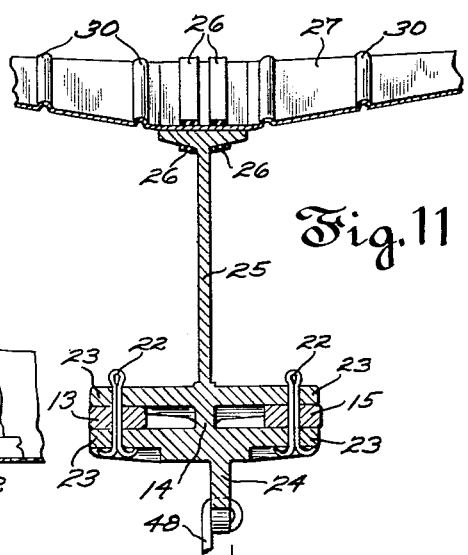
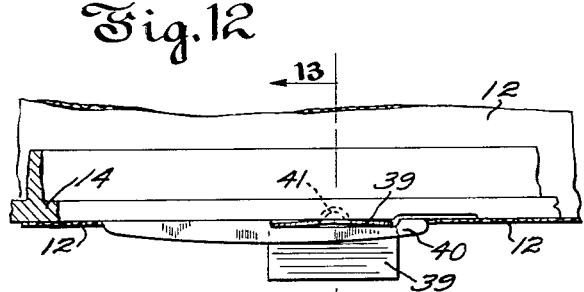
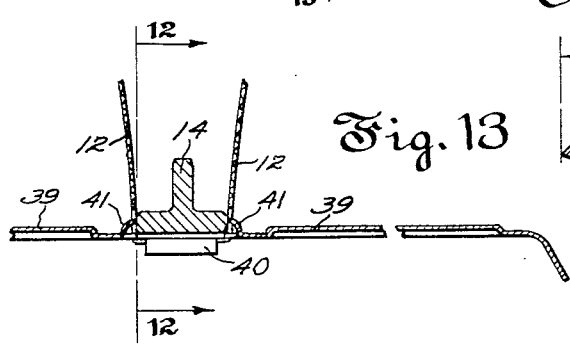
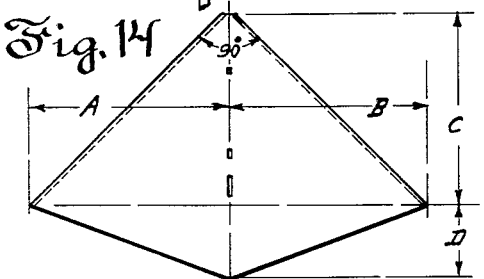

United States Patent Office 3,153,877
Patented Oct. 27, 1964

3,153,877
SOARING AND GLIDING AIRCRAFT
William L. Effinger, Jr., Hamden, and Henry Struck, Hamburg, Conn., assignors to The A. C. Gilbert Company, New Haven, Conn., a corporation of Maryland
Filed Nov. 14, 1962, Ser. No. 237,539
15 Claims. (Cl. 46—78)

This invention relates to aircraft capable of performing in some respects as kites and in other respects as gliders and airplanes. While in larger sizes an aircraft constructed and operated as herein disclosed is capable of supporting and carrying a heavy work load suspended therefrom, a model aircraft embodying the principles of the invention can be built in small sizes characteristic of toys in the kite family and herein is so shown for purposes of explaining the present improvements.

Traditionaly a familiar form of kite is an aircraft heavier than air that is without propelling means other than a tow line, its support and ability to soar being derived from the force of the wind moving past its surfaces while its tow line is maneuvered below. Such simple form of toy kite may have a frame that comprises simple cross-sticks lashed together in perpendicularlar relation in the form of a Roman cross. To such frame is attached a thin cover of paper, fabric or other light weight flexible sheet material. The transverse frame member or "bow" is fixed to the fore-and-aft frame member or "rib" of the kite at a point near the leading edge of the cover sheet which usually is outlined as the blunt end of a diamond shape. Such transverse frame member is trailed by a relatively long, slender end of the kite usually is of narrow V-shape and tapers rearward to a point sometimes carrying thereat a "tail." The forward or blunt leading portion of this common form of kite breasts the air and advances upward when the kite is flown.

It is known from U.S. Patent No. 2,537,560 that a kite of somewhat diamond-shaped outline without any transverse member can be flown with its narrow pointed end foremost and with its relatively blunt end trailing, the trailing portion comprising V-shaped areas of the cover sheet that have enough slack transversely to arch upward to a higher level than the fore-and-aft member or rib of the kite. In such construction the edges of the cover sheet that lead into the air need be kept tautly stretched and the centrally positioned relatively low fore-and-aft rib or spar can be rigid and serve as a keel that divides the wash of the air into two approximately parallel channels so as to keep the kite gliding dependably on a constant course with its pointed end foremost and without necessity for a plurality of bridle lines running to lateral extremities of the cover sheet such as are proposed in U.S. Patent No. 2,546,078.

An object of this invention is to produce more dependably controlled performance of aircraft, and particularly model aircraft, of the above mentioned types.

Another object is to impart to an aircraft whose wings comprise a flexible cover sheet stronger load sustaining and lifting power when gliding at relatively slow speeds through the air.

A contributary object is to provide the flexible cover sheet with relatively stiff spars at lateral edges so oriented as to permit adequate "wash out" or lateral escape of the craft buoying air to defeat collapse of the cover sheet during sharp turns and side slips.

Another object is to equip the aircraft so that it can act not only as a kite and as a glider but also as an automotive airplane when equipped with a prime mover and whether the aircraft is tethered or free flying.

A related object is to make such a combined kite, glider and automotive airplane self climbing from a small ground area to a flying altitude without dependence on wind or need of towing a control line along the ground. Thus the aircraft can be flown from a smaller area than heretofore has been possible, such as the roof of an apartment house.

Another object is to cause the aircraft, whether soaring or self-propelled, to glide to a smooth landing of its own accord under all circumstances without the destructive effect of nose diving to the ground.

A contributary object is to equip the craft with a buoying surface forward of and above the air entering nose thereof to prevent nose diving or plunging downward of the craft when gliding to a landing.

Another oject is to enable the aircraft whether tethered or free, and while high in the air, to become converted automatically from an engine powered airplane to a non-propelled glider, and to accomplish this by letting the engine, whether of propeller or jet type, become automatically stopped through exhaustion of a limited supply of its gasoline fuel or by cutting off the current by bridle line action if a battery powered electric motor with propeller serves as the prime mover.

These and other objects of the invention will appear in greater particular from the following description of a successful embodiment of the invention having reference to the appended drawings wherein:

FIG. 1 is a perspective view of an automotive aircraft viewed from beneath its flying level embodying the present improvements and shown with its length contracted better to illustrate the construction.

FIG. 2 is a fragmentary plan view of the nose portion of the craft showing the true outline shape of the stabilizer.

FIG. 3 is a side elevation of the craft drawn on a reduced scale.

FIG. 4 is a view of the trailing end of the craft looking from the right at FIG. 3.

FIG. 5 is a full plan view of the aircraft.

FIG. 6 shows the craft held by one hand of the operator with the other hand ready to spin the propeller to start the engine.

FIG. 7 shows the craft with its engine runing, being held by one hand of the operator while its tethering line is in the grasp of the operator's other hand.

FIG. 8 shows the craft automatically abrutly rising to a flying altitude with its tethering line trailing and available to the operator.

FIG. 9 shows an attitude of the craft after leveling off upon attaining altitude.

FIG. 10 is an enlarged view taken in section on the planes 10—10 in FIG. 5 looking in the direction of the arrows.

FIG. 11 is a fragmentary similarly enlarged view taken in section on the plane 11—11 in FIG. 3 looking in the direction of the arrows.

FIG. 12 is a similarly enlarged view of the mounting of the propeller shroud on the main spar of the craft showing the shroud in cross section at its mounted portion on the plane 12—12 in FIG. 13.

FIG. 13 is a fragmentary view in cross section on the plane 13—13 in FIG. 12 looking in the direction of the arrows.

FIG. 14 on a reduced scale shows the preferred shape and proportions of a cover sheet of suitable size to produce successful performance of a model aircraft having the fore-and-aft length mentioned hereinafter.

The structure of the automotive aircraft shown in the drawings comprises preferably a continuous sheet 12 of flexible material which covers two V-shaped areas between fore-and-aft angularly related stiff spars 13, 14 and 15, referred to hereinafter respectively as the left spar, the main spar and the right spar with reference to their positions as viewed from above and looking toward the nose of the craft. The angles formed by these three spars are determined by struts or bracer members 16 which may be formed by a continuous length of stiff wire removably anchored to all three of the spars is indicated in FIG. 10.

Each of the side spars 13 and 15, when disengaged from the strut, are enabled to swing about respective pivots 20 and 21 carried at the nose of the craft so as to collapse into close parallel relation to the main spar 14 for compacting the structure into a linear package to save space in storage and shipping. These side spars 13 and 15 are wrapped within hemmed marginal portions of the cover sheet 12 which is affixed to the bottom surface of the main spar where crossing the latter.

The spar pivots 20 and 21 comprise hinge pins 22 that extend through the front ends of the side spars and through vertically spaced apart lugs 23 fixed on each side of the nose of the craft. These lugs may consist of four integral molded projections of the front end of the main spar. Below the lugs 23 there is an anchorage bracket 24 depending from and integral with the main spar 14. Above the plane of spar 14 and also integral therewith there is a rigid standard 25 on which is removably seated and held by means of an elastic band 26 the stabilizer 27. The stabilizer has the generally triangle shape in plan view as shown in FIG. 2. Its lateral wing portions are upwardly inclined for proper aerodynamic attitude for preventing nose diving of the craft when approaching its landing. The retaining elastic band 26 is stretched fore-and-aft along the top surface of the stabilizer and is an endless band whose bight hooks under prong-like extensions 28 and 29 projecting respectively forward and rearward from the standard 25. Preferably the stabilizer is made of very thin light weight sheet material stiffened by the fore-and-aft extending embossed beads 30. The side spars 13 and 15 slant upward in flight with respect to the main spar 14 from the nose to the trailing end of the craft by means of the upward slant of the lugs 23 relative to the plane of the main spar 14 as evident in FIGS. 1 and 3 and 10 of the drawings.

In approximately the location indicated in FIG. 3, load affording elements depend in the form of substructure including a pistol grip form of spur bracket 36 on which is mounted a prime mover in the form of an internal combustion engine 37 driving the propeller 38 or other source of propulsion power such as a jet engine. The preferred angle of the axis of the propeller to the main spar 14 is indicated in FIG. 3 and for protecting the propeller a shroud 39 is provided in the form of a stiff crosswise extending strip that is lodged fixedly and removably against the bottom surface of the main spar 14 as best shown in FIGS. 12 and 13. A central portion of the length of the shroud is removably clamped against the bottom surface of the spar by a recessed cantilever resilient finger 40 that may be integral with the material of the spar which preferably is a resilient plastic highly resistant to impact. Shroud 39 is retained lengthwise in relation to the spar by projections 41 struck upward from the material of the shroud.

What will herein be termed the bridle member 48 of the craft serves the function of landing gear to prevent injury to the engine and its propeller. It comprises a reach of stiff wire of the shape shown in FIG. 3 whose front end is anchored in the bracket 24 and whose rear end is anchored to the bottom end of bracket 36. It, or its equivalents, constitutes skid means attached to and depending below the weight affording substructure and is disposed to slidably support the weight of the craft when the latter glides to a landing. In a mean portion of its fore-and-aft length the wire of the bridle is looped at 49 and thereat pivotally engaged by the looped end of a tow rod 50 whose opposite end has attached to it the tethering line 51.

An aircraft constructed as described in the foregoing can be flown as a kite making use for remaining aloft of the restraint of a tow line in the manner characteristic of kites. But if released from the tow line, a kite embodying the present improvements will glide to earth in the direction in which the main spar 14 is aligned unless buffeted by violent cross currents of air and will come smoothly to a landing on its bridle 48 upon reaching the ground instead of wafting or swirling down like a falling leaf. It will not nose dive because when gliding in a forward direction its nose is buoyed upward by the aerodynamic effect of the airfoil stabilizer 27. In such use as a simple kite there may be required for launching of the craft a towing by the operator in a direction against the wind.

To make such towing operation unnecessary and to enable the aircraft to be launched instantly and then manuevered as a self powered glider whether or not tethered by a tow line, the bracket 36 which depends rigidly from the main spar 14 serves as a pistol grip type of handle for holding the craft in preparation for launching it. The prime mover 37, 38 which is located lengthwise of the main spar 14 approximately midway of the length of the craft, will react against the air to drive the aircraft nose first through the air in a direction determined by the attitude of the main spar 14 which may be compared to the keel of a boat because it channels the air that flows beneath the cover sheet of the craft in courses that are generally parallel with the main spar. Hence the craft will rise as shown in FIGS. 8 and 9 in the direction in which it is pointed when released by the hand of the operator shown holding the spur bracket 36 in FIG. 7 in pistol grip fashion after the engine has been started by spinning the propeller as shown in FIG. 6.

The rigid fixity to main spar 14 of bracket 36 and of the load parts carried thereby comprising a substructure of the craft having its center of gravity spaced substantially below the main spar 14, automatically stabilizes the craft against both roll and pitch because continued increase of such roll or pitch must swing such center of gravity of the substructure either laterally and upward, or fore or aft and upward, in relation to the center of lifting power of the wing sheet, whereupon the weight of the substructure will automatically create a torque moment on the main spar that offers increasing opposition to excessive roll or pitch of the craft. Heretofore in craft of the flex wing type, stabilization has been sought by suspending the load structure swingably from a plurality of the spars either by means of flexible shroud lines converging downward from the lateral spars to the load structure or by suspending a passenger occupied fuselage or "bed" of the craft swingably from the main spar and/or associated bracing framework for the wing sheet. In either case the aforesaid torque moment is absent and in the latter case suitable mechanism has been proposed by means of which the passenger or pilot, for maintaining stability of the craft, can correctively vary and determine the eccentricity of the center of gravity of the substructure relative to the main spar and to the center of lifting force of the wing sheet.

The engine may be stocked with a limited supply of fuel in such small quantity as to become exhausted when the craft attains an intended altitude. When deprived of propulsion power by exhaustion of the fuel the craft will become a free flying or tethered glider depending on whether or not the tow line 51 is retained under control of the operator. FIG. 3 shows the aircraft gliding gradually to a landing on the ground with its nose prevented from excessive dipping by the stabilizer 27.

Aircraft such as above described may be variously termed a "parawing," "flexwing" or "paraglider." The present example may be equipped with wheeled landing gear and it is preferred to mount such landing gear on the engine supporting bracket 36 that depends from the main spar.

The cover sheet 12 may be a transparent plastic sheeting with its edges looped about the lateral spars 13 and 15 so as to envelope the same and then heat sealed to the main sheet to form the hem. This confines said edges to coincidence with said spars respectively and prevents flapping of these edges of the wing sheet. A convenient way to secure the rear edge of the sheet to the end of the main spar is by a clip 52. The cover sheet extends under the main spar and has apertures to accommodate the passing of all parts that project downward therefrom.

For toy and model purposes a suitable non-limiting size and proportion of parts is that the main spar 12 may be thirty inches long with a 3¼" projection of the stabilizer 25 forwardly thereof. The upward slant of the lateral spars 13, 15 with respect to the horizontal plane of the main spar 14 and various other proportions of the parts may be as shown in the drawings so that the lateral overall width of the craft approximately may measure about three-quarters of its length. The developed shape and area of the cover sheet is shown in FIG. 14 wherein the dimensions designated A, B, C and D may respectively be 22", 22", 21" and 8". The angle formed by the air entering edges may be 90 degrees as compared with an overall angle of 52 degrees formed by the lateral spars 13 and 15. This determines the fullness of arching permitted to the cover sheet which can be varied by installing differing lengths of the strut wire 16. If the stabilizer becomes damaged the elastic band 26 which holds it on standard 25 permits of easy replacement. The shroud 39 likewise is easily replaceable without tools, and all of these parts are shown to be removably held on an integral molded structure comprising the mian spar 14, its standard 25, anchorage lugs 23 and 24 and resilient shroud clip 40 of high impact plastic.

The engine 37 may be replaced with a propeller equipped, battery driven electric motor whose running can be started and stopped while the craft is aloft by swinging or other action of the tow hook as manipulated from the ground by means of the towing or tethering line 51. The propeller may be disposed at the rear of the engine instead of forward thereof.

These and other variations will be suggested by the foregoing disclosure and the appended claims are directed not only to the constructions shown but to all obvious equivalents thereof.

We claim:

1. An automotive glidable model aircraft of the flexible wing type having an air entering nose and comprising, a main stiff spar extending rearward from the nose of the aircraft, a weight affording substructure depending from and rigid with said main spar including an aerodynamic prime mover fixed in a position relative to said main spar to react on ambient air in a direction to impel said main spar nose foremost, two lateral spars free from weight sustaining connection to said substructure on respectively opposite sides of said main spar mutually converging toward said nose of the aircraft to form tapering spaces between said main spar and said lateral spars, a flexible wing sheet free from weight sustaining connection to said substructure spanning each of said tapering spaces and connecting said main spar with each of said lateral spars and having an areal expanse sufficiently exceeding that of said tapering spaces to arch upward over said spaces with respect to all of said spars when the craft is airborne, and spar bracing means free from weight sustaining connection to said substructure extending crosswise said main spar and engaged with said lateral spars in a manner to hold the latter in angularly spread relation to said main spar, together with a stabilizer comprising an airfoil supported on and above said main spar near said nose of the aircraft.

2. An automotive glidable aircraft as defined in claim 1, together with a substantially stiff bridle member bridging the distance between the said spur bracket and the said nose of the aircraft below and in a common vertical plane with the said main spar.

3. A glidable model aircraft as defined in claim 1, together with skid means attached to and depending below the said weight affording substructure and disposed to slidably support the weight of the craft when the latter glides to a landing.

4. An automotive glidable aircraft as defined in claim 1, in which the said prime mover comprises a miniature internal combustion engine having its cylinder block rigidly connected to the said main spar, and a propeller approximately midway the length of the craft carried and powered by said engine to rotate about an axis extending in fixed relation to said main spar in the general direction of the length thereof.

5. An automotive glidable aircraft as defined in claim 4, in which the said propeller axis diverges slightly downward from parallelism with the said main spar in the forward direction of the aircraft.

6. An automotive glidable aircraft as defined in claim 4, together with a shroud fixedly carried by the said main spar and extending crosswise thereof between said main spar and the said propeller in the plane of rotation of the latter.

7. A glidable aircraft of the flexible wing type having an air entering nose comprising, a main fore-and-aft spar extending rearward from the nose of the aircraft, two lateral spars on respectively opposite sides of said main spar mutually converging toward said nose of the aircraft to form tapering spaces between said main spar and said lateral spars, a flexible wing sheet spanning each of said spaces and connecting said main spar with each of said lateral spars having an area sufficiently in excess of the space spanned by said sheet to arch upward with respect to all of said spars thereby to form inverted air channels on respectively opposite sides of said main spar when the craft is air-borne, together with a stabilizer comprising an airfoil supported on and above said main spar near the nose of the aircraft.

8. A glidable aircraft of the flexible wing type as defined in claim 7, in which the said airfoil comprises a stiff thin plate of shape to form a foremost pointed end disposed to enter the air ahead of the said channels.

9. A glidable aircraft as defined in claim 7, in which the said lateral spars are straight and aligned with substantially the full length of the lateral edges respectively of the said flexible wing sheet and are secured thereto throughout a sufficient portion of the spar length to prevent deflection of said sheet edges from said alignment.

10. A glidable aircraft of the flexible wing type as defined in claim 7, together with a standard upstanding from the said main spar in fore-to-aft alignment therewith and supporting the said airfoil.

11. A glidable aircraft of the flexible wing type as defined in claim 10, in which the said standard has a relatively thin upstanding web portion topped by a relatively wider crown, and the said plate of the stabilizer is seated on said crown portion of the stabilizer.

12. A glidable aircraft of the flexible wing type as defined in claim 11, together with an elastic band engaging the said plate of the said stabilizer and the said crown of the said standard in a manner to clamp said plate and said crown yieldably together.

13. A glidable aircraft of the flexible wing type having an air entering nose and comprising, a main fore-and-aft spar extending rearward from said nose of the aircraft, two lateral spars on respectively opposite sides of said main spar mutually converging toward said nose to form tapering spaces between said main spar and said lateral spars, a flexible wing sheet spanning each of said spaces and connecting said main spar respectively with each of said lateral spars having an area sufficiently in excess of the space spanned by said sheet to arch upward over said tapering spaces with respect to all of said spars thereby to form inverted air channels on respectively opposite sides of said main spar when the craft is air-borne, a spur bracket rigid with said main spar and stemming downward therefrom to a sufficient distance therebelow to afford a handle for holding and launching the aircraft, a substantially stiff bridle member bridging the distance between the said spur bracket and said nose of the aircraft disposed in a common vertical plane with and below the said main spar to serve as landing gear, the forward end of said bridle member being secured to said main spar and the rear end of said bridle member being secured to said spur bracket, and a substantially stiff tow rod having one end pivotally connected to said bridle member between said ends of the latter.

14. A glidable aircraft as defined in claim 13, together with an aerodynamic prime mover fixed on the said spur bracket in a position relative to the said main spar to react on ambient air in a direction to impel said main spar nose foremost.

15. A glidable model aircraft of the flexible wing type having an air entering nose and comprising, a main stiff spar extending rearward from the nose of the aircraft, two lateral spars on respectively opposite sides of said main spar mutually converging toward said nose of the aircraft to form forwardly tapering separate spaces between said main spar and said lateral spars, a flexible wing sheet spanning and arching up separately over each of said tapering spaces and connecting said main spar to each of said lateral spars, and a weight affording substructure depending from and rigidly affixed to said main spar having its center of gravity substantially spaced therebelow and supportingly upheld solely thereby in flight, whereby rolling or pitching of said craft is automatically opposed by a torque moment created by the upward swinging of said center of gravity relatively to the center of lifting power of the wing sheet, said weight affording structure comprising a spur bracket rigid with the said main spar and stemming downward therefrom to a sufficient distance therebelow and of suitable size and shape to afford a pistol grip type of handle adapted to be grasped and held for supporting and orienting said main spar and stabilizer when launching the craft at take-off.

References Cited in the file of this patent

UNITED STATES PATENTS 2,537,560    Wanner _____ Jan. 9, 1951

OTHER REFERENCES

Aviation Week Magazine, pages 57, 59, 63, Sept. 19, 1960.

Interavia Magazine, page 1520, November 1961.

Popular Mechanics Magazine, November 1961, pages 85–89.